Nov. 29, 1932.  H. KRATKY  1,888,989
SPRINGING SYSTEM FOR POWER DRIVEN VEHICLES
Filed Dec. 5, 1929
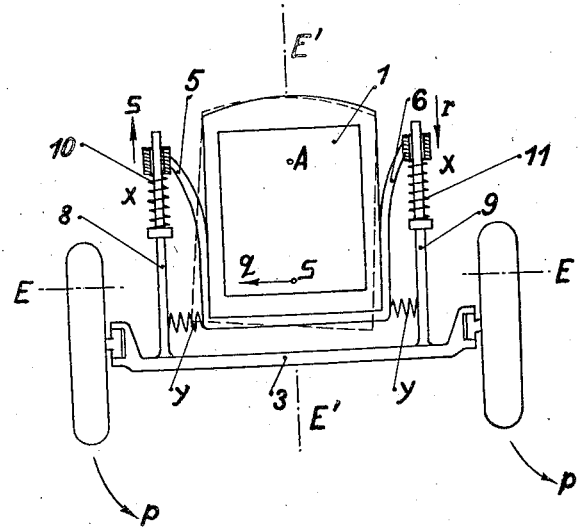
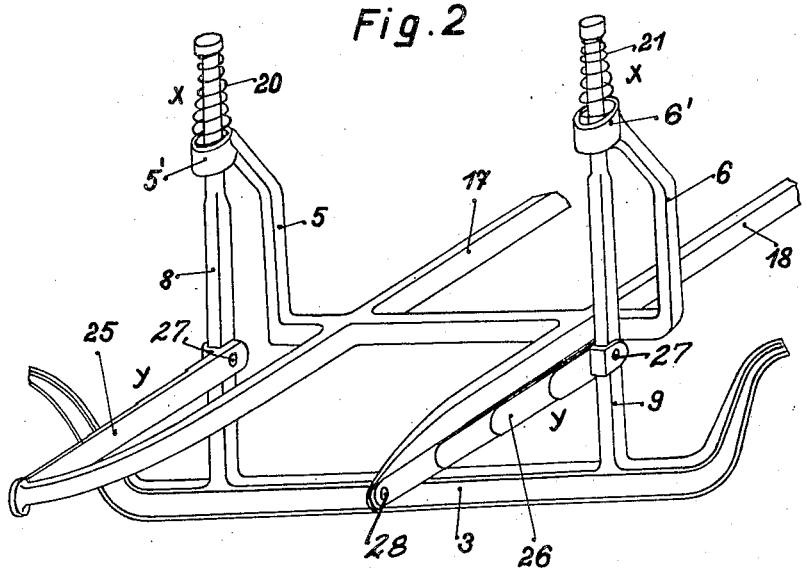
HANS KRATKY
Inventor
By his Attorney Patented Nov. 29, 1932

1,888,989

UNITED STATES PATENT OFFICE

HANS KRATKY, OF VIENNA, AUSTRIA

SPRINGING SYSTEM FOR POWER DRIVEN VEHICLES

Application filed December 5, 1929, Serial No. 411,846, and in Austria December 5, 1928.

This invention relates to the springing of power-driven vehicles. In the usual forms of springing the sprung portion of the vehicle (bodywork and chassis) is supported on springs which are directly attached to the two axles. This resilient coupling, which is responsible not only for the springing but also for the supporting and retention of the sprung portion of the vehicle, implies the creation of a pivot-point located between the two springs and between the sprung and the unsprung portions of the vehicle about which the sprung portion can oscillate on a plane at right angles to the direction of travel. When the vehicle is travelling in a curve centrifugal force tends to tilt the sprung portion, the centre of gravity of which is located above the previously mentioned pivot-point, outwards, whereby in the case of a car the occupants are subjected to the sensation of being flung out, or it may well be that the danger of being flung out does actually exist for the occupants. The reduction of the load on the springs on the inner side when the car is travelling in a curve also gives rise to the danger that, if the sprung portion receives a jolt on the inner side through the wheels on the inner side meeting with a hindrance, this portion of the vehicle tilts still further over than if the springs which received the thrust or shock were more heavily laden, since experience shows that a more heavily laden vehicle travels much more smoothly, that is to say with much slighter oscillations, over the same unevennesses in the road surface than when it is only lightly laden. A comparatively slight hindrance acting on the wheels on the inner side is thus capable of tilting a vehicle over when it is travelling in a curve, especially if the camber of the road is such as to act in the same sense and to reinforce this tendency.

The present invention has for its purpose to obviate the above described drawbacks, and this is accomplished in accordance with the invention by the placing of the resilient connection between the sprung and the unsprung portions of the vehicle, which also retains the sprung portion in position, above the centre of gravity of the sprung portion. It is also advisable to provide between the sprung and the unsprung portions of the vehicle, apart from the above mentioned resilient connection, an additional connection which is rigid in a horizontal sense in the direction of the length of the vehicle and resilient in a vertical sense and horizontally across the vehicle, i. e. in a direction at right angles to the longitudinal axis of the vehicle.

In the springing system according to the invention, the centrifugal force acting at the centre of gravity when the vehicle is travelling in a curve tends to tilt the part of the sprung portion of the vehicle which is situated beneath the resilient connection and contains the centre of gravity outwards. The result is that the springs on the inner side with regard to the curve are submitted to increased tension, the bodywork of the car tilts with its upper part inwards, the occupants are relieved of the sensation of being flung out, and smooth and pleasant traveling is ensured. The shocks and impacts of hindrances acting on the wheels on the inner side of the curve are imparted, in the springing system according to the invention, to the springs which are most under tension, and these shocks are therefore absorbed with less tilting effect on the sprung portion of the vehicle than in the case of ordinary springing systems. The tilting of the car automatically effected by centrifugal force can also be used to set the wheels automatically obliquely to the direction of the centrifugal force action.

Examples of the embodiment of the invention are shown in the drawing, in which:—

Fig. 1 shows the springing of a power-driven vehicle diagrammatically in front elevation.

Fig. 2 is a perspective view of an example of a form of construction in accordance with the invention.

$a$, $a$ are the resilient connections between the sprung portion 1 of the vehicle and the unsprung portion 3, which also retain the sprung portion 1. These connections $a$ are disposed above the horizontal plane E—E passing through the centre of gravity $s$ of the sprung portion of the vehicle. The resilient connections $a$ may be constructed in any one of many possible ways. In the diagrammatic system shown in Fig. 1 the sprung portion of the vehicle is provided with struts 5 and 6, which are guided on struts 8 and 9 attached to the unsprung portion of the vehicle and elastically supported as against these latter struts by springing means 10 and 11. The upwardly extending struts 8 and 9 are preferably attached to the axles of the front or rear wheels. The struts 5 and 6 and 8 and 9 are disposed at both sides of the longitudinal mid plane E'—E' of the vehicle.

Apart from the connections x located above the plane E—E passing through the centre of gravity, the sprung portion 1 is connected with the unsprung portion 3 by means of further connections y, which, as is particularly shown in the example of a form of construction shown in Fig. 2, are rigid in the direction of the length of the vehicle but resilient in the crosswise and vertical directions. The additional connections y are preferably so constructed as to be capable of springing, for the purpose of absorbing the oscillations of the sprung portion of the vehicle in a crosswise direction.

Assuming the car is travelling to the left in the direction of the arrow p shown in the drawing centrifugal force acts at the centre of gravity s in the direction of the arrow q. The turning moment produced by centrifugal force causes the sprung portion of the vehicle, which is retained and sprung by the connections x, to be turned about an imaginary axis A located between the connections x into the position shown in broken lines. Meanwhile the forces acting on the connections x are in the directions of the arrows r and s, that is to say the spring 11 situated on the inner side of the curve is compressed, while the spring 10 situated on the outer side of the curve is relieved.

In the example of a form of construction for a springing system shown in Fig. 2 x again denotes the resilient connections between the sprung and the unsprung portions of the vehicle which also retain the unsprung portion, and y again denotes the additional connections between the aforesaid portions of the vehicle. The upwardly extending struts 8 and 9 on both sides of the vertical mid plane of the vehicle are in this form of construction again provided on the axle 3. 17 and 18 are the longitudinal members of the chassis and are provided with upwardly extending struts 5 and 6, which are coupled with the struts 8 and 9 by means of the connections x, x in such a manner that they provide guides for the latter struts and at the same time form a resilient or yielding connection. In the form of construction shown in Fig. 2 the sprung portion of the vehicle hangs on the springs 20 and 21, which form part of the connections x. The sockets 5' and 6' formed on the ends of the struts 5 and 6 embrace the struts 8 and 9 with a certain amount of clearance or play, so that the sprung portion of the vehicle is enabled to tilt in response to the influence of centrifugal force.

The additional connections y, which are rigid in the direction of the length of the vehicle and constructed so as to be resilient in the crosswise and vertical directions, consist, in the form of construction shown, of leaf springs 25 and 26, which are attached at one of their ends to any point on the sprung portion of the vehicle, for instance to the forward projecting ends of the longitudinal side members 17 and 18 of the chassis, and at their other ends to the unsprung portion of the vehicle, for instance to the struts 8 and 9 as in the form of construction shown. The leaf springs 25 and 26 at their inner ends are pivotally mounted on pins 27, which are carried by the upright struts 8 and 9, and at their outer ends the springs are pivotally mounted on pins 28 disposed on the outer ends of the longitudinal side members 17 and 18. This arrangement is such that the springs 25 and 26 are free to move in vertical planes. In this manner the action of the resilient connections x is not impaired.

In the previously described examples of forms of construction the struts provided on the sprung portion extend in each case upwards. These carrying stays of the bodywork of the vehicle may of course equally well extend downwards from above to a connection x, which is disposed above the centre of gravity of the sprung portion of the vehicle.

I claim:—

1. In a spring suspension system for power driven vehicles, resilient connecting means for the body and the running gear of the vehicle, said resilient means being disposed above the horizontal plane passing through the centre of gravity of the body portion of the vehicle and further means connecting the body and the running gear of the vehicle, whereby a rigid connection is effected in the direction of length of the vehicle and a resilient connection is effected in a transverse and an upright direction.

2. In a spring suspension system for power driven vehicles, resilient connecting means for the body and the running gear frame of the vehicle, said resilient means being disposed above the horizontal plane passing through the centre of gravity of the body portion of the vehicle, and leaf springs forming an additional connection between the body and the running gear frame of the vehicle, the ends of the said leaf springs being pivotally articulated to the body portion and to the running gear frame of the vehicle, 3. In a spring suspension system for power driven vehicles, struts disposed at both sides of the vehicle and attached to the running gear of the vehicle, further struts disposed at both sides of the vehicle and attached to the body portion of of the vehicle and resilient means connecting the said struts attached to the running gear and the body portion respectively, said resilient means being disposed above the horizontal plane passing through the centre of gravity of the body portion of the vehicle and further means connecting the body and the running gear of the vehicle, whereby a rigid connection is effected in the longitudinal direction of the vehicle and a resilient connection is effected in a transverse and a vertical direction.

In testimony whereof I affix my signature.

HANS KRATKY.